(12) United States Patent
Zhang et al.

(10) Patent No.: US 12,022,303 B2
(45) Date of Patent: Jun. 25, 2024

(54) INFORMATION TRANSMISSION METHOD, TERMINAL DEVICE, NETWORK DEVICE, CHIP AND STORAGE MEDIUM

(71) Applicant: GUANGDONG OPPO MOBILE TELECOMMUNICATIONS CORP., LTD., Dongguan (CN)

(72) Inventors: Jinyu Zhang, Dongguan (CN); Rongyi Hu, Dongguan (CN); Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/368,976

(22) Filed: Sep. 15, 2023

(65) Prior Publication Data

US 2024/0007875 A1  Jan. 4, 2024

Related U.S. Application Data

(63) Continuation of application No. PCT/CN2021/081900, filed on Mar. 19, 2021.

(51) Int. Cl.
*H04W 24/02* (2009.01)

(52) U.S. Cl.
CPC .................. *H04W 24/02* (2013.01)

(58) Field of Classification Search
CPC .................................................. H04W 24/02
See application file for complete search history.

(56) References Cited

U.S. PATENT DOCUMENTS

| 2018/0034598 | A1 | 2/2018 | Yiu et al. |
| 2020/0084677 | A1* | 3/2020 | Yiu ............... H04W 76/28 |

FOREIGN PATENT DOCUMENTS

| CN | 107637120 A | 1/2018 |
| CN | 108366379 A | 8/2018 |
| WO | 2018144927 A1 | 8/2018 |
| WO | 2018144584 A1 | 9/2018 |
| WO | 2018213396 A1 | 11/2018 |
| WO | 2022143510 A1 | 7/2022 |

OTHER PUBLICATIONS

International Search Report issued in International application No. PCT/CN2021/081900, mailed Dec. 17, 2021.
Written Opinion of the International Searching Authority issued in International application No. PCT/CN2021/081900, mailed Dec. 17, 2021.

(Continued)

*Primary Examiner* — Chuong A Ngo
(74) *Attorney, Agent, or Firm* — BAYES PLLC

(57) ABSTRACT

The present application relates to an information transmission method, a terminal device, and a network device The terminal device includes: a processor; and a memory storing instructions executable by the processor. When the instructions are executed by the processor, the terminal device is caused to: in a case where Network Control Small Gap (NCSG) is supported, send first indication information to a network device. The first indication information is used to indicate NCSG configuration information supported by the terminal device.

18 Claims, 4 Drawing Sheets

```
                                                    S510
┌──────────────────────────────────────────────────────┐
│ Receive, by a network device, first indication      │
│ information which is sent by a terminal device in a │
│ case where Network Control Small Gap (NCSG) is      │
│ supported                                            │
└──────────────────────────────────────────────────────┘
                          │
                                                    S520
┌──────────────────────────────────────────────────────┐
│ Determine, by the network device, NCSG configuration│
│ information supported by the terminal device        │
│ according to the first indication information       │
└──────────────────────────────────────────────────────┘
```

(56) References Cited

OTHER PUBLICATIONS

"On Introduction of Network Controlled Small Gaps for NR", Source: Nokia, Nokia Shanghai Bell, Agenda item: 11.5.2.3, 3GPP TSG-RAN WG4 Meeting #98-e, R4-2102689, Electronic Meeting, Jan. 25-Feb. 5, 2021.
"Discussion on NCSG in NR", Agenda Item: 11.5.2.3, Source: Intel Corporation, 3GPP TSG RAN WG4 Meeting #98-e, R4 21 01271, Electronic Meeting, Jan. 25-Feb. 5, 2021.
"Network Controlled Small Gap", Agenda Item: 11.5.2.3, Source: MediaTek Inc., 3GPP TSG-RAN WG4 Meeting #98-e R4-2101064, Electronic Meeting, Jan. 25-Feb. 5, 2021.
"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.5.0 (Jun. 2023).
"3rd Generation Partnership Project; Technical Specification Group Radio Access Network; NR; Radio Resource Control (RRC) protocol specification (Release 17)", 3GPP TS 38.331 V17.5.0 (Jun. 2023).
"Comparison of options for signalling of per CC gap capabilities", Agenda Item: 7.30.2, Source: Ericsson, 3GPP TSG-RAN WG4 Meeting #82 R4-1700632, Athens, Greece, Feb. 13-17, 2017.
"3rd Generation Partnership Project; Technical Specification Group Radio Access Network; Evolved Universal Terrestrial Radio Access (E-UTRA); Requirements for support of radio resource management (Release 18)", 3GPP TS 36.133 V18.2.0 (Jun. 2023).
Extended European Search Report issued in corresponding European application No. 21930909.3, mailed Apr. 4, 2024.

\* cited by examiner

INFORMATION TRANSMISSION METHOD, TERMINAL DEVICE, NETWORK DEVICE, CHIP AND STORAGE MEDIUM

CROSS-REFERENCE TO RELATED APPLICATIONS

This application is a continuation of International Application No. PCT/CN2021/081900, filed on Mar. 19, 2021, the entire content of which is incorporated herein by reference.

TECHNICAL FIELD

Embodiments of the present disclosure relate to the communication technical field, and more specifically, to an information transmission method, a terminal device, a network device, a chip, a computer-readable storage medium, a computer program product and a computer program.

BACKGROUND

Usually, in a wireless communication system, a terminal device measures a reference signal, so as to obtain cell-related information according to the measurement result. For example, positioning measurement is realized based on the measurement of a Positioning Reference Signal (PRS), or Radio Resource Management (RRM) measurement is realized based on the measurement of Synchronization Signal Block (SSB), etc.

The measurement of the reference signal is performed by the terminal device in a Measurement Gap (MG). The MG will cause interruption of data transmission time. How to reduce the data interruption time is an urgent problem to be solved in the measurement configuration scenario.

SUMMARY

In view of the above, embodiments of the present disclosure provide an information transmission method, a terminal device, a network device, a chip, a computer-readable storage medium, a computer program product and a computer program, which can be used to reduce data interruption time.

An embodiment of the present disclosure provides an information transmission method, including:
  in a case where Network Control Small Gap (NCSG) is supported, sending, by a terminal device, first indication information to a network device;
  wherein the first indication information is used to indicate NCSG configuration information supported by the terminal device.

An embodiment of the present disclosure provides an information transmission method, including:
  receiving, by a network device, first indication information which is sent by a terminal device in a case where Network Control Small Gap (NCSG) is supported; and
  determining, by the network device, NCSG configuration information supported by the terminal device according to the first indication information.

An embodiment of the present disclosure further provides a terminal device, including:
  a first communication module configured to, in a case where Network Control Small Gap (NCSG) is supported, send first indication information to a network device;
  wherein the first indication information is used to indicate NCSG configuration information supported by the terminal device.

An embodiment of the present disclosure further provides a network device, including:
  a second communication module configured to receive first indication information which is sent by a terminal device in a case where Network Control Small Gap (NCSG) is supported; and
  a processing module configured to determine NCSG configuration information supported by the terminal device according to the first indication information.

An embodiment of the present disclosure further provides a terminal device, including: a processor and a memory, wherein the memory is used to store a computer program, and the processor calls and runs the computer program stored in the memory to perform the above information transmission method.

An embodiment of the present disclosure further provides a network device, including: a processor and a memory, wherein the memory is used to store a computer program, and the processor calls and runs the computer program stored in the memory to perform the above information transmission method.

An embodiment of the present disclosure further provides a chip, including: a processor configured to call and run a computer program from a memory, so that a device installed with the chip performs the above information transmission method.

An embodiment of the present disclosure further provides a computer-readable storage medium for storing a computer program, wherein the computer program causes a computer to perform the above information transmission method.

An embodiment of the present disclosure further provides a computer program product, including computer program instructions, wherein the computer program instructions cause a computer to perform the above information transmission method.

An embodiment of the present disclosure further provides a computer program, which causes a computer to perform the above information transmission method.

According to the technical solutions of the embodiments of the present disclosure, if the terminal device supports the NCSG, first indication information is sent to indicate the NCSG configuration information supported by the terminal device. In this way, the network device can perform configuration accordingly, and the terminal device can perform measurement based on the NCSG. Since the measurement based on the NCSG only needs a short interruption time for the adjustment of the radio frequency chain, the data interruption time during the measurement can be reduced.

DETAILED DESCRIPTION

Figure 1:
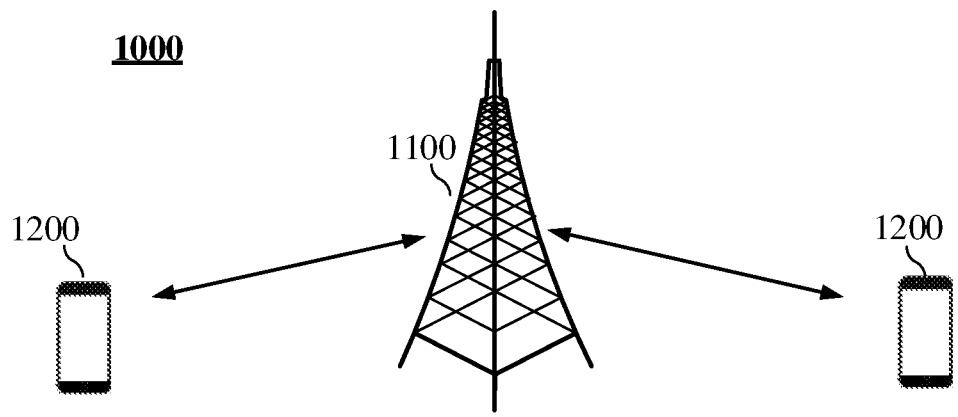
FIG. 1 is a communication system architecture according to an embodiment of the present disclosure.

The technical solutions in embodiments of the present disclosure will be described below with reference to the drawings in the embodiments of the present disclosure.

Technical solutions according to embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system, or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), Vehicle to Vehicle (V2V) communications, or Vehicle to everything (V2X), etc. Embodiments of the present disclosure can be applied to these communications systems.

Optionally, the communication systems in embodiments of the present disclosure may be applied to a Carrier Aggregation (CA) scenario, or may be applied to a Dual Connectivity (DC) scenario, or may be applied to a stand-alone (SA) network deployment scenario.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc.

The terminal device may be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN).

In embodiments of the present disclosure, the terminal device may be deployed on land, including indoor or outdoor, handheld, wearable or vehicle-mounted; or, the terminal device may be deployed on water (such as on ships, etc.); or, the terminal device may be deployed in the air (such as on aircraft, balloons, and satellites, etc.).

In embodiments of the present disclosure, the terminal device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in embodiments of the present disclosure, the terminal device may also be a wearable device. The wearable device may also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realizes powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

In embodiments of the present disclosure, the network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station (Evolutional Node B, eNB or eNodeB) in LTE, or a relay station or an access point, or a vehicle-mounted device, a wearable device, a network device (gNB) in an NR network, or a network device in future evolved PLMN network.

By way of example and not limitation, in embodiments of the present disclosure, the network device may have mobile characteristics, for example, the network device may be a mobile device. Optionally, the network device may be a satellite, or a balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. Optionally, the network device may also be a base station deployed on land, or water, etc.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

FIG. 1 schematically shows a network device 1100 and two terminal devices 1200. Optionally, the wireless communication system 1000 may include multiple network devices 1100, and the coverage range of each network device 1100 may include other number of terminal devices, and embodiments of the present disclosure do not impose limitations on this. Optionally, the wireless communication system 1000 shown in FIG. 1 may further include other network entities such as a Mobility Management Entity (MME), an Access and Mobility Management Function (AMF), and embodiments of the present disclosure do not impose limitations on this.

It should be understood that a device with a communication function in the network/system in the embodiments of the present disclosure may be referred to as a communication device. Taking the communication system shown in FIG. 1 as an example, the communication device may include a network device and a terminal device with the communication function. The network device and the terminal device may be the specific devices in the embodiments of the present disclosure, and detailed descriptions are not provided here. The communication device may further include other devices in the communication system, such as a network controller, a mobility management entity or other network entities, which are not limited in the embodiments of the present disclosure.

It should be understood that the terms "system" and "network" are often used interchangeably herein. The term "and/or" herein is used to describe an association relationship of associated objects, for example, indicating that there can be three kinds of relationships between associated objects. For example, A and/or B can mean three cases: A alone, B alone, and A and B together. The character "/" herein generally indicates that the associated objects after and before the character are in an "or" relationship.

It is to be understood that "indication/indicate" referred to in embodiments of the present disclosure may be a direct indication, an indirect indication, or representing an association relationship. For example, A indicates B can mean that A indicates B directly, for example, B may be obtained through A; or A indicates B can mean that A indicates B indirectly, for example, A indicates C and B may be obtained through C; or, A indicates B can mean that A and B have an association relationship.

In the description of embodiments of the present disclosure, the term "correspond/corresponding" may indicate a direct correspondence or indirect correspondence between two objects, or may indicate an association relationship between the two objects, or may be a relationship of indicating and being indicated, or configuring and being configured, etc.

In order to facilitate the understanding of the technical solutions of the embodiments of the present disclosure, related technologies of the embodiments of the present disclosure are described below. The following related technologies can be combined with the technical solutions of the embodiments of the present disclosure as optional solutions, and all of them fall within the protection scope of the embodiments of the present disclosure.

Figure 2A:
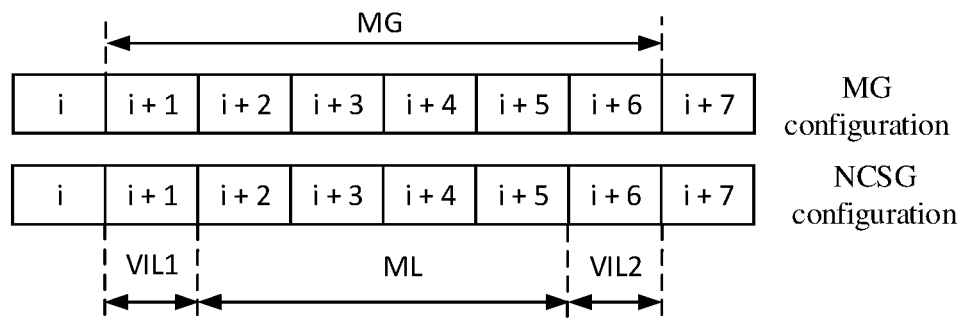
FIG. 2A is a schematic diagram of an exemplary MG and NCSG configuration in a synchronous scenario.
Figure 2B:
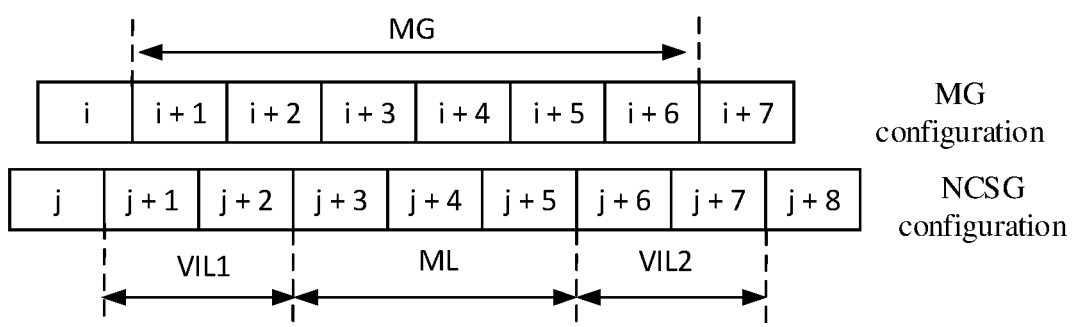
FIG. 2B is a schematic diagram of an exemplary MG and NCSG configuration in an asynchronous scenario.

In order to reduce the interruption time caused by terminal device measurement, a network controlled small gap (NCSG) is introduced in the LTE system. When the NCSG is activated, a terminal device may use an idle Radio Frequency (RF) chain to perform measurement, and only a short interruption time is required for the adjustment of the radio frequency chain during the measurement, and longer MG is not needed. FIG. 2A is a schematic diagram of an exemplary MG and NCSG configuration in a synchronous scenario. FIG. 2B is a schematic diagram of an exemplary MG and NCSG configuration in an asynchronous scenario. As shown in FIG. 2A and FIG. 2B, MG includes the (i+1)-th subframe to the (i+6)-th subframe in the time domain, which will cause an interruption of 6 subframes. When using NCSG, it is only needed to use the Visible Interruption Length (VIL) at the beginning and end of the 6 subframes to adjust the radio frequency chain, such as VIL1 and VIL2 in FIG. 2A and FIG. 2B. Therefore, a short interruption is caused only in a small number of subframes included in VIL1 and VIL2. In the Measurement Length (ML), the measurement and data transmission and reception in a serving cell may be performed at the same time, which can effectively reduce the data interruption time while ensuring the measurement. Obviously, whether the terminal device can support NCSG is a capability, for example, whether the terminal device has an idle RF resource. In a case where the terminal device reports to the network device whether the terminal device has the NCSG capability or whether the terminal device supports the NCSG, the network device can adaptively configure relevant information of the MG and/or NCSG.

Four kinds of NCSG configurations shown in Table 1 are defined in LTE protocol 36.133. Here, the NCSG configuration includes a NCSG pattern. A NCSG pattern whose pattern identifier (ID) is x can be recorded as NCSG #x, and correspondingly, a MG pattern whose pattern ID is y can be recorded as MG pattern #y. The NCSG pattern has a corresponding relationship with the MG pattern, or in other words, the NCSG pattern is derived based on the MG pattern. Referring to Table 1, NCSG #0 and NCSG #2 are NCSG patterns applicable to synchronous and asynchronous scenarios based on MG pattern #0, corresponding to FIG. 2A and FIG. 2B respectively. NCSG #1 and NCSG #3 are NCSG patterns applicable to synchronous and asynchronous scenarios respectively based on MG pattern #1. The Visible Interruption Repetition Period (VIRP) of the NCSG is equal to the repetition period of the MG, that is, the Measurement Gap Repetition period (MGRP). The sum of VIL1, ML and VIL2 in the NCSG pattern is equal to the length of MG, that is, the Measurement Gap Length (MGL).

TABLE 1

| NCSG configuration supported by a terminal device in the LTE system | | | | |
|---|---|---|---|---|
| NCSG pattern ID | VIL before measurement (VIL1, ms) | ML with no gap (ms) | VIL after measurement (VIL2, ms) | VIRP (ms) |
| 0 | 1 | 4 | Downlink (DL): 1 Uplink (UL): 2 | 40 |
| 1 | 1 | 4 | DL: 1 UL: 2 | 80 |
| 2 | 2 | 3 | 2 | 40 |
| 3 | 2 | 3 | 2 | 80 |

On this basis, the reported capability information of the terminal device includes indication information ncsg-r14. The optional value or enumerated value (ENUMERATED) of ncsg-r14 includes supported, and ncsg-r14 is described in the following form in protocol 36.133:

ncsg-r14 ENUMERATED {supported}

The ncsg-r14 is used to indicate whether the NCSG is supported. If the capability information reported by the terminal device includes ncsg-r14, the terminal device supports the NCSG. Further, if the terminal device supports asynchronous Dual Connectivity (DC), the terminal device supports NCSG #0, NCSG #1, NCSG #2, and NCSG #3. If the terminal device does not support asynchronous DC, the terminal device only supports NCSG #0 and NCSG #1. That is to say, in a case where the NCSG is supported, NCSG #0 and NCSG #1 are mandatory NCSG configurations, or in other words, NCSG #0 and NCSG #1 are mandatory to be supported.

The terminal device sends indication information gapIndication-r14 to the network device in unit of Component Carrier (CC). The gapIndication-r14 is used to indicate whether the terminal device needs MG or NCSG configuration for measurement on a corresponding CC. The enumerated values of gapIndication-r14 include gap, ncsg and nogap-noNcsg. The gapIndication-r14 is described in protocol 36.133 in the following form:

gapIndication-r14 ENUMERATED {gap, ncsg, nogap-noNcsg}

The gap indicates that the terminal device needs MG configuration for measurement on the corresponding carrier, and the ncsg indicates that the terminal device needs NCSG configuration for measurement on the corresponding carrier, and the nogap-noNcsg indicates that the terminal device needs neither MG configuration nor NCSG configuration for measurement on the corresponding carrier.

In the NR system, the terminal device can support up to 26 MG patterns, specifically as shown in Table 2:

TABLE 2

MG configuration supported by a terminal device in the NR system

| MG pattern ID | MGL (ms) | MGRP (ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |
| 24 | 10 | 80 |
| 25 | 20 | 160 |

Among them, MG pattern #0 and #1 are mandatory to be supported, and whether other MG patterns are supported depends on UE capability. The terminal device reports whether the terminal device supports other MG patterns to the network device through signaling.

The capability information reported by the terminal device includes a measurement and mobility parameter (MeasAndMobParameters) Information Element (IE). The signaling supportedGapPattern containing a 22-bit string in the IE is used to indicate whether MG patterns #2~#23 are supported, and the signaling supportedGapPattern-r16 containing 2-bit string is used to indicate whether MG patterns #24~#25 are supported. Specifically, the above parameters including the bit rate (Bit String) can be described in the following form:

| | | |
|---|---|---|
| supportedGapPattern | BIT STRING (SIZE (22)) | OPTIONAL |
| supportedGapPattern-r16 | BIT STRING (SIZE (2)) | OPTIONAL |

In the NR system, the terminal device may be configured as different Dual Connectivity (DC)/Carrier Aggregation (CA) combinations. Under different DC/CA combinations, the MG requirement for measurement performed by the terminal device may be different. For example, in CA combination 1, it is needed perform measurement based on the MG; and in CA combination 2, measurement can be performed without the MG. Therefore, in the NR system, the capability of the terminal device to dynamically report its MG need is introduced. Specifically, the parameter nr-NeedForGap-Reporting-r16 is also included in MeasAndMobParameters IE:

nr-NeedForGap-Reporting-r16
  ENUMERATED{supported} OPTIONAL

This parameter is used to indicate whether the terminal device supports dynamic reporting of MG requirement information, or is used to indicate whether the terminal device has the capability of dynamically reporting MG requirement information.

If the terminal device supports dynamic reporting of MG requirement information, the network device indicates the terminal device whether to enable the function of dynamically reporting MG requirement information through signaling needForGapsConfigNR in Radio Resource Control (RRC) related information, such as RRC reconfiguration information (RRCReconfiguration) or RRC resume information (RRCResume).

When the network device indicates to enable this function, for example, when the value of signaling needForGapsConfigNR is setup, the terminal device carries the MG requirement information (NeedForGapsInfoNR) in corresponding RRC complete information (RRC Complete), such as RRC reconfiguration complete information (RRCReconfigurationComplete) or RRC resume complete information (RRCResumeComplete). The MG requirement information is used to indicate whether the MG is needed when the terminal device performs measurement on a designated NR frequency band. The MG requirement information may include intra-frequency MG requirement information (gapIndicationIntra-r16) and inter-frequency MG requirement information (gapIndication-r16). The enumerated values of the information include gap and no-gap. Among them, gap indicates that the MG is needed, and no-gap indicates that the MG is not needed. MG requirement information may be described in the following form:

| | |
|---|---|
| gapIndicationIntra-r16 | ENUMERATED {gap, no-gap} |
| gapIndication-r16 | ENUMERATED {gap, no-gap} |

Figure 3:
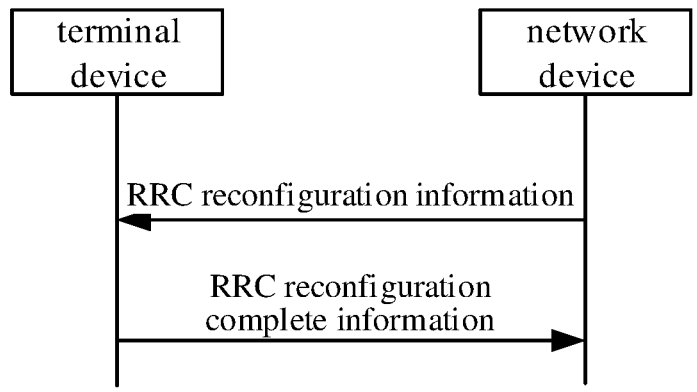
FIG. 3 is a schematic flowchart of dynamically reporting MG requirement information by a terminal device.

In the example of FIG. 3, the network device indicates whether to enable the function of dynamically reporting MG requirement information in the RRC reconfiguration information (RRCReconfiguration), and the terminal device carries the MG requirement information in the RRC reconfiguration complete information (RRCReconfiguration Complete). FIG. 3 shows a schematic flowchart of dynamically reporting the MG requirement information by the terminal device. It can be understood that based on RRCResume and RRCResumeComplete and a flow similar to that shown in FIG. 3, the terminal device may also complete the dynamic reporting of MG requirement information.

It can be seen that in the NR system, related functions with respect to the NCSG are missing. Therefore, the terminal device performs measurement based on the MG, and the data interruption time is relatively long. Specifically, in the NR system, there is a lack of a procedure for the terminal device to report whether it supports NCSG and specific supported configuration information. Since the number of MG patterns defined in the NR system is much greater than the number of MG patterns defined in the LTE system, more NCSG patterns may be derived in the NR system. In the related art, it is not proposed how to indicate the NCSG patterns supported by the terminal device. Furthermore, in the NR system, the terminal device and the network device only interact with each other for dynamically reporting of the MG requirement information, and cannot realize the dynamic reporting of NCSG requirement information.

The solutions provided in the embodiments of the present disclosure are mainly used to solve at least one of the above problems.

In order to understand the characteristics and technical contents of the embodiments of the present disclosure in more detail, the implementation of the embodiments of the present disclosure will be described in detail below in conjunction with the accompanying drawings. The attached drawings are only for reference and description, and are not intended to limit the embodiments of the present disclosure.

Figure 4:
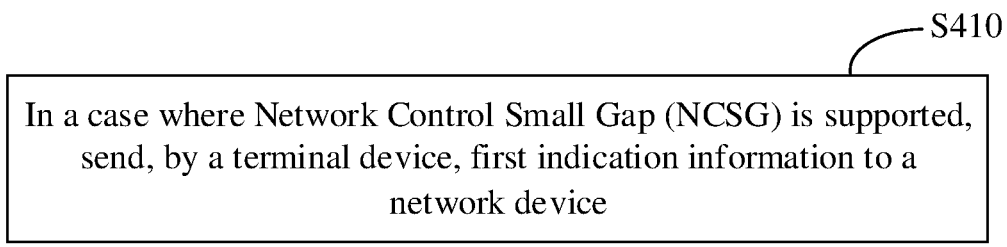
FIG. 4 is a schematic flowchart of an information transmission method according to an embodiment of the present disclosure.

An embodiment of the present disclosure provides an information transmission method applied to a terminal device. As shown in FIG. 4, the method includes:

In step S410, in a case where Network Control Small Gap (NCSG) is supported, the terminal device sends first indication information to a network device;
wherein the first indication information is used to indicate NCSG configuration information supported by the terminal device.

Figure 5:
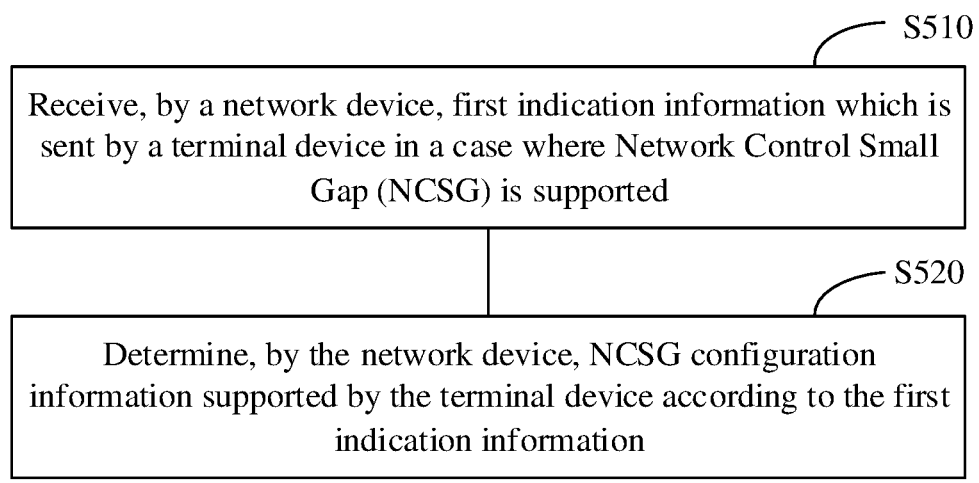
FIG. 5 is a schematic flowchart of an information transmission method according to another embodiment of the present disclosure.

Correspondingly, an embodiment of the present disclosure further provides an information transmission method applied to a network device. As shown in FIG. 5, the method includes:

In step S510, the network device receives first indication information which is sent by a terminal device in a case where Network Control Small Gap (NCSG) is supported.

In step S520, the network device determines NCSG configuration information supported by the terminal device according to the first indication information.

Exemplarily, the NCSG configuration information may include at least one NCSG pattern.

For example, a plurality of pieces of NCSG configuration information may be defined or pre-configured in a communication system. Each piece of NCSG configuration information may include one NCSG pattern. Alternatively, each piece of NCSG configuration information may include multiple NCSG patterns obtained by offsetting a reference NCSG pattern corresponding to the NCSG configuration information based on multiple offset values. A NCSG pattern may include information such as the period VIRP of the NCSG, the visible interruption lengths VIL1 and VIL2, and the measurement length ML. Correspondingly, the first indication information may indicate the NCSG configuration information supported by the terminal device by indicating the position, number, or identity of the NCSG configuration information supported by the terminal device in multiple pieces of NCSG configuration information defined by the system.

In an embodiment of the present disclosure, if the terminal device supports the NCSG, first indication information is sent to indicate the NCSG configuration information supported by the terminal device. In this way, the network device can perform configuration accordingly, and the terminal device can perform measurement based on the NCSG. Since the measurement based on the NCSG only needs a short interruption time for the adjustment of the radio frequency chain, the data interruption time during the measurement can be reduced.

In an exemplary implementation, the first indication information may include first signaling, and the first signaling is used to indicate MG configuration information (such as an MG pattern) supported by the terminal device. The MG configuration information supported by the terminal device has a corresponding relationship with the NCSG configuration information supported by the terminal device.

For example, the first signaling may be the signaling supportedGapPattern in the MeasAndMobParameters IE in the NR system. The signaling indicates the MG configuration information supported by the terminal device in the form of a bit string. If the terminal device indicates in the signaling supportedGapPattern that the terminal device supports certain MG configuration information MG Pattern #i, the network device may determine the NCSG configuration information corresponding to the MG Pattern #i supported by the terminal device. In practical applications, one piece of MG configuration information may correspond to one or more pieces of NCSG configuration information.

Optionally, the above MG configuration information may include multiple concurrent MG (Concurrent Gap) patterns. A plurality of pieces of MG configuration information may be defined or pre-configured in the communication system, and each piece of MG configuration information includes a plurality of MG patterns obtained by offsetting a reference MG pattern corresponding to the MG configuration information based on a plurality of offset values. When the terminal device indicates to support first MG configuration information in the multiple pieces of MG configuration information, the terminal device supports multiple MG patterns in the first MG configuration information. Correspondingly, the terminal device supports NCSG configuration information corresponding to all or part of the multiple MG patterns.

In an exemplary implementation, the first indication information may include newly added signaling in the NR system, for example, newly added signaling in the MeasAndMobParameters IE. As an example but not a limitation, the first indication information or the signaling may be recorded as supported NCSGPattern.

Optionally, the first indication information may include a first sequence, and the first sequence includes identity information of NCSG configuration information supported by the terminal device.

For example, N NCSG patterns are pre-configured in the communication system, and the first sequence may be a set of identity information (NCSGpatternId-r17) of some of the NCSG patterns. For example, the first sequence includes NCSG #3, NCSG #5, NCSG #6 and so on.

Exemplarily, when the first indication information supportedNCSGPattern includes the first sequence (SEQUENCE), the first indication information may be described in the following form:

supportedNCSGPattern::=SEQUENCE(SIZE(1 . . .
        maxNCSGPattern)) OF NCSGpatternId-r17

Optionally, the first indication information includes a first bit string. The first bit string includes N bits, each of the N bits corresponds to at least one piece of NCSG configuration information, and NCSG configuration information corresponding to different bits of the N bits is different. When a value of an i-th bit among the N bits is a first value, the i-th bit is used to indicate that the terminal device supports at least one piece of NCSG configuration information corresponding to the i-th bit; where N is a positive integer, and i is a positive integer less than or equal to N.

The first value is a predetermined value, such as 0 or 1.

Optionally, when the value of the i-th bit among the N bits is not the first value, the i-th bit is used to indicate that the terminal device does not support at least one piece of NCSG configuration information corresponding to the i-th bit.

Taking the first value being 1 and N=5 as an example, if the 5 bits are 00011, the terminal device supports the NCSG configuration information corresponding to the 4th and 5th bits, but does not support the NCSG configuration information corresponding to the 1st-3rd bits.

Exemplarily, when the first indication information supportedNCSGPattern includes a first bit string (BIT STRING), the first indication information may be described in the following form:

supportedNCSGPattern BIT STRING (SIZE (N))

In an embodiment of the present disclosure, multiple optional exemplary ways of setting the corresponding relationship between each bit in the first bit string and the NCSG configuration information are also provided:

Example 1: the i-th bit corresponds to i-th NCSG configuration information in the pre-configured N pieces of NCSG configuration information.

For example, N pieces of NCSG configuration information are pre-configured in the system, and N bits in the first bit string are in one-to-one correspondence with N pieces of NCSG configuration information. If the fifth bit and the sixth bit in the first bit string are 1, the terminal device supports the fifth NCSG configuration information and the sixth NCSG configuration information among the N pieces of NCSG configuration information.

From another perspective, the number N of bits in the first bit string may be the number of pieces of NCSG configuration information defined or pre-configured in the system.

Example 2: the i-th bit corresponds to an i-th NCSG configuration information group in pre-configured N NCSG configuration information groups; the i-th NCSG configuration information group includes at least one piece of NCSG configuration information.

For example, M pieces of NCSG configuration information are pre-configured in the system, which are divided into N NCSG configuration information groups. Each NCSG configuration information group includes two pieces of NCSG configuration information. There is a one-to-one correspondence between N bits in the first bit string and pre-configured N NCSG configuration information groups. If the sixth bit in the first bit string is 1, the terminal device supports two pieces of NCSG configuration information included in the sixth NCSG configuration information group.

From another perspective, the number N of bits in the first bit string may be the number of NCSG configuration information groups defined or pre-configured in the system, and may be related to the total number M of pieces of pre-configured NCSG configuration information and the number of pieces of NCSG configuration information in each NCSG configuration information group, for example, N=M/2.

Optionally, at least one piece of NCSG configuration information included in the i-th NCSG configuration information group corresponds to the same MG configuration information.

For example, N pieces of MG configuration information are pre-configured in the system, corresponding to N NCSG configuration information groups in one-to-one correspondence. At least one piece of NCSG configuration information in the i-th NCSG configuration information group is designed based on the i-th MG configuration information in the N pieces of MG configuration information.

Optionally, at least one piece of NCSG configuration information included in each of the N NCSG configuration information groups may be applicable to different scenarios, such as a synchronous scenario or an asynchronous scenario.

For example, the i-th NCSG configuration information group includes first NCSG configuration information and second NCSG configuration information, both of which are applicable to a synchronous scenario, wherein the second NCSG configuration information is also applicable to an asynchronous scenario. When the i-th bit in the first bit string is the first value, the terminal device supports the i-th NCSG configuration information group. Moreover, in a synchronous scenario, the first NCSG configuration information and the second NCSG configuration information are supported. In an asynchronous scenario, the second NCSG configuration information is supported.

Example 3: the i-th bit corresponds to i-th non-mandatory NCSG configuration information in the pre-configured M pieces of NCSG configuration information; wherein the M pieces of NCSG configuration information include L pieces of mandatory NCSG configuration information and N pieces of non-mandatory NCSG configuration information, and both M and L are positive integers.

That is to say, M pieces of NCSG configuration information are pre-configured in the system, and the terminal device supports by default L pieces of NCSG configuration information among the M pieces of NCSG configuration information or the L pieces of NCSG configuration information are mandatory to be supported, for example, NCSG configuration information corresponding to MG pattern #0 and MG pattern #1 which are mandatory to be supported in the NR system, and the first bit string is used to determine other NCSG configuration information supported by the terminal device from the M pieces of NCSG configuration information except the L pieces of NCSG configuration information. Based on this, the number N of bits in the first bit string is related to the number M of pieces of NCSG configuration information pre-configured in the system and the number L of pieces of mandatory NCSG configuration information, and specifically, N=M−L.

Example 4: the i-th bit corresponds to an i-th non-mandatory NCSG configuration information group among pre-configured X NCSG configuration information groups, and the i-th non-mandatory NCSG configuration information group includes at least one piece of NCSG configuration information. The X NCSG configuration information groups include Y mandatory NCSG configuration information groups and N non-mandatory NCSG configuration information groups, and both X and Y are positive integers.

For example, M pieces of NCSG configuration information are pre-configured in the system and divided into X NCSG configuration information groups. Among them, the terminal device supports by default Y NCSG configuration information groups or the Y NCSG configuration information groups are mandatory to be supported, for example, NCSG configuration information groups corresponding to MG pattern #0 and MG pattern #1 which are mandatory to be supported in the NR system, and the first bit string is used to determine other NCSG configuration information group(s) supported by the terminal device from the X NCSG configuration information groups except the Y NCSG configuration information groups. Based on this, the number N of bits in the first bit string is related to the number X of NCSG configuration information groups pre-configured in the system and the number Y of mandatory NCSG configuration information groups, and specifically, N=X−Y.

Optionally, at least one piece of NCSG configuration information included in the i-th non-mandatory NCSG configuration information group corresponds to the same MG configuration information.

For example, multiple pieces of MG configuration information (MG pattern #0 and MG pattern #1) which are mandatory to be supported and N pieces of non-mandatory MG configuration information are pre-configured in the system, and the N pieces of non-mandatory MG configuration information correspond to the N non-mandatory NCSG configuration information groups in a one-to-one correspondence. At least one piece of NCSG configuration information in the i-th non-mandatory NCSG configuration information group is designed based on the i-th non-mandatory MG configuration information in the N pieces of non-mandatory MG configuration information.

Optionally, at least one piece of NCSG configuration information contained in each non-mandatory NCSG configuration information group in the N non-mandatory NCSG configuration information groups may be applicable to different scenarios, such as a synchronous scenario or an asynchronous scenario.

In some exemplary implementations of the present disclosure, the above first indication information is not only used to indicate the NCSG configuration information supported by the terminal device, but also used to indicate that the terminal device supports the NCSG. That is to say, when the terminal device sends the first indication information indicating supported NCSG configuration information, the network device may determine that the terminal device supports the NCSG. Specifically, the above information transmission method may further include:

in a case of receiving the first indication information sent by the terminal device, determining by the network device that the terminal device supports the NCSG.

In some other exemplary implementations of the present disclosure, other indication information may be used to indicate that the terminal device supports the NCSG. Specifically, the above information transmission method applied to the terminal device may further include:

sending, by the terminal device, second indication information to the network device; wherein the second indication information is used to indicate whether the terminal device supports the NCSG.

Correspondingly, the above information transmission method applied to network device further includes:

receiving, by the network device, the second indication information sent by the terminal device; and determining, by the network device, whether the terminal device supports the NCSG according to the second indication information.

Optionally, the second indication information may include switch information, and the second indication information or the switch information may be recorded as ncsg-r17. This switch information may be described in the following ways:

ncsg-r17 ENUMERATED {supported} OPTIONAL

As an example, the terminal device sends the second indication information ncsg-r17 only in a case where the terminal device supports the NCSG. That is to say, in the case of receiving the second indication information ncsg-r17, the network device determines that the terminal device supports the NCSG. If the second indication information ncsg-r17 is not received, the network device determines that the terminal device does not support the NCSG.

As another example, in a case where a value of the second indication information is a preset value such as a fourth value, the second indication information is used to indicate that the terminal device supports the NCSG; in a case where the value of the second indication information is another preset value such as a fifth value, the second indication information is used to indicate that the terminal device does not support the NCSG.

For example, the fourth value is 1, and the fifth value is 0. If the second indication information ncsg-r17 is 1, the terminal device supports the NCSG; if the second indication information ncsg-r17 is 0, the terminal device does not support the NCSG.

In some application scenarios, other signaling may be used to indicate whether the NCSG is supported in a specific scenario. Exemplarily, in a case where the second indication information includes second signaling, the second indication information is used to indicate that the NCSG is supported in a case where the terminal device performs inter-frequency measurement.

The second signaling is used to indicate that the MG is not needed in a case where terminal device performs inter-frequency measurement. For example, the second signaling may be the signaling interFreqConfig-NoGap in the MeasAndMobParameters IE in the NR system.

That is to say, the second signaling may be reused to implicitly indicate that the NCSG is supported in a case where the terminal device performs inter-frequency measurement. Correspondingly, determining, by the network device, whether the terminal device supports the NCSG according to the second indication information may include:

in a case where the second indication information includes the second signaling, determining, by the network device, that the NCSG is supported in a case where the terminal device performs inter-frequency measurement;

wherein the second signaling is used to indicate that that the MG is not needed in a case where terminal device performs inter-frequency measurement.

For example, when receiving the signaling interFreqConfig-NoGap, the network device determines that the terminal device does not need the MG and supports the NCSG when performing inter-frequency measurement. Based on this, after the network device performs corresponding configuration, the terminal device may perform measurement based on the NCSG in the case of inter-frequency measurement.

Optionally, the second indication information includes first intra-frequency indication information and/or first inter-frequency indication information;

the first intra-frequency indication information is used to indicate whether the terminal device supports the NCSG in a case of intra-frequency measurement;

the first inter-frequency indication information is used to indicate whether the terminal device supports the NCSG in a case of inter-frequency measurement.

For example, the second indication information may include two pieces of switch information: first intra-frequency indication information intraFreqConfig-NCSG and first inter-frequency indication information interFreqConfig-NCSG. The intra-frequency measurement scenario and the inter-frequency measurement scenario are indicated separately.

Correspondingly, determining by the network device whether the terminal device supports the NCSG according to the second indication information may include:

determining, by the network device, whether the terminal device supports the NCSG in a case of intra-frequency measurement according to first intra-frequency indication information in the second indication information; and/or, determining, by the network device, whether the terminal device supports the NCSG in a case of inter-frequency measurement according to first inter-frequency indication information in the second indication information.

The above describes the reporting of NCSG-related capabilities from different perspectives through multiple embodiments. As an example but not a limitation, in combination with multiple implementations, the following method is used to describe the MG-related capability and NCSG-related capability of the terminal device in the MeasAndMobParameters IE:

For example, in the case of receiving the third indication information sent by the terminal device, the network device determines that the terminal device supports dynamic reporting of NCSG requirement information.

In another example, the network device receives the third indication information sent by the terminal device and a value of the third indication information is a preset value such as a sixth value, the network device determines that the terminal device supports dynamic reporting of NCSG requirement information.

Exemplarily, the third indication information may include newly added signaling in the NR system, for example, newly added signaling in the MeasAndMobParameters IE. As an example but not a limitation, the third indication information may be recorded as nr-NeedForNcsg-Reporting-r17. The third indication information may be described in the following form in the IE:

nr-NeedForNcsg-Reporting-r17
    ENUMERATED{supported} OPTIONAL

When the network device determines that the terminal device supports dynamic reporting of NCSG requirement information, the network device may perform corresponding configuration and enable dynamic reporting of NCSG requirement information. Optionally, the above-mentioned information transmission method applied to the network device further includes:

sending, by the network device, fourth indication information to the terminal device, wherein the fourth indication information is used to indicate a frequency band for which the NCSG is dynamically reported.

```
MeasAndMobParametersCommon ::=     SEQUENCE {
    supportedGapPattern            BIT STRING (SIZE (22))          OPTIONAL,
    ......
    nr-NeedForGap-Reporting-r16    ENUMERATED{supported}           OPTIONAL,
    supportedGapPattern-r16        BIT STRING (SIZE (2))           OPTIONAL
ncsg-r17                           ENUMERATED {supported}          OPTIONAL
supportedNCSGPattern::=SEQUENCE(SIZE(1.. maxNCSGPattern)) OF NCSGpatternId-r17
or
supportedNCSGPattern               BIT STRING (SIZE (N))
}
```

After the communication system confirms that the terminal device supports the NCSG based on the first indication information and/or the second indication information, optionally, the terminal device and the network device may perform interaction(s) to confirm whether dynamic reporting of NCSG requirement information is supported, for example, NCSG is needed or NCSG is not needed, or in other words, measurement is performed based on the NCSG or measurement is performed not based on the NCSG.

Optionally, the above information transmission method applied to the terminal device may further include:

sending, by the terminal device, third indication information to the network device, wherein the third indication information is used to indicate whether the terminal device supports dynamic reporting of NCSG requirement information.

Correspondingly, the above-mentioned information transmission method applied to the network device may further include:

determining, by the network device, whether the terminal device supports dynamic reporting of NCSG requirement information according to the third indication information sent by the terminal device.

Optionally, the fourth indication information may further be used to indicate whether to enable dynamic reporting of NCSG.

Correspondingly, the above information transmission method applied to the terminal device further includes:

receiving, by the terminal device, fourth indication information from the network device, wherein the fourth indication information is used to indicate a frequency band for which the NCSG is dynamically reported.

The frequency band for which the NCSG is dynamically reported is a frequency band for which the NCSG requirement information is dynamically reported.

Exemplarily, the terminal device may determine the frequency band for which the NCSG is dynamically reported according to the fourth indication information.

In an exemplary embodiment, the fourth indication information may be newly added signaling in the NR system, which is used to indicate that the network device enables dynamic reporting of the NCSG requirement information and indicate the frequency band for which the NCSG is dynamically reported. For example, a signaling needForNCSGsConfigNR-r17 is newly added in RRCReconfiguration and/or RRCResum as the fourth indication information.

Taking RRCReconfiguration as an example, the RRCReconfiguration information may include the following description:

| | | |
|---|---|---|
| needForGapsConfigNR-r16 | SetupRelease{NeedForGapsConfigNR-r16} OPTIONAL, | -- Need M |
| needForNCSGsConfigNR-r17 | SetupRelease{NeedForNCSGsConfigNR-r17} OPTIONAL, | -- Need M |

And, in the NeedForNCSGsConfigNR IE under the needForNCSGsConfigNR-r17 directory, the frequency band for which NCSG is dynamically reported is indicated.

In another exemplary implementation, the fourth indication information is carried by third signaling, and the third signaling is used to indicate whether the network device supports dynamic reporting of the MG requirement information.

For example, the third signaling may be the signaling needForGapsConfigNR-r16 in RRCReconfiguration and/or RRCResume used to indicate whether to enable dynamic reporting of MG requirement information.

Taking RRCReconfiguration as an example, the RRCReconfiguration information may include the following description:

```
needForGapsConfigNR-r16
    SetupRelease{NeedForGapsConfigNR-r16}
    OPTIONAL,                                Need M
```

And, the NeedForGapsConfigNR IE under the needForGapsConfigNR-r16 directory carries fourth indication information for indicating whether to enable dynamic reporting of NCSG requirement information and indicating a frequency band for which the NCSG is dynamically reported.

Optionally, the third signaling is further used to indicate a frequency band for which the MG is dynamically reported. For example, the NeedForGapsConfigNR IE includes requestedTargetBandFilterNR-r16, which is used to indicate the frequency band for which the MG is dynamically reported.

In the embodiments of the present disclosure, various optional example specific ways of indicating the frequency band for which the NCSG is dynamically reported in the fourth indication information are provided:

Example 5: the fourth indication information includes frequency band indication information, and the frequency band indication information is used to indicate whether to use the frequency band for which the MG is dynamically reported as the frequency band for which the NCSG is dynamically reported.

For example, the fourth indication information may include a flag requestedNcsgFlagNR-r17. When the value of the flag is 1, it indicates that the frequency band for which the MG is dynamically reported as indicated in the requestedTargetBandFilterNR-r16 is used as the frequency band for which the NCSG is dynamically reported. When the value of the flag is 0, it means that there is no need to dynamically report NCSG requirement information.

As an example but not a limitation, the frequency band indication information may be described in the following form in a relevant IE:

```
requestedNcsgFlagNR-r17 ENUMERATED{true}
    OPTIONAL
```

Example 6: the fourth indication information includes a second sequence, and the second sequence includes identity information of a frequency band for which the NCSG is dynamically reported.

That is to say, the fourth indication information directly indicates the frequency band for which the NCSG is dynamically reported in the form of a set of identity information. As an example but not a limitation, the fourth indication information may be described in the following form in a relevant IE:

```
requestedTargetBandFilterNcsgNR-r17
    EQUENCE(SIZE(1..maxBands))        OPTIONAL
    OF reqBandIndicatorNR
```

Example 7: the fourth indication information includes a second bit string;

The second bit string includes K bits, each bit in the K bits corresponds to at least one frequency band, and different bits in the K bits correspond to different frequency bands;

In a case where a value of a j-th bit among the K bits is a second value, the j-th bit is used to indicate that at least one frequency band corresponding to the j-th bit is a frequency band for which the NCSG is dynamically reported.

For example, K=5, the second bit string is 01100, and the frequency band corresponding to the second bit and the frequency band corresponding to the third bit are the frequency bands for which the NCSG is dynamically reported.

Optionally, each bit in the second bit string may correspond to at least one frequency band for which the MG is dynamically reported. For example, the number K of bits in the second bit string may be the number of frequency bands for which the MG is dynamically reported as indicated in the requestedTargetBandFilterNR-r16, and the K bits in the second bit string correspond to the K frequency bands indicated in the requestedTargetBandFilterNR-r16 in a one-to-one correspondence.

After determining the specific reporting frequency band, the terminal device may report NCSG requirement information, that is, reporting whether to perform measurement based on the NCSG. Optionally, the above information transmission method applied to the terminal device may further include:

sending, by the terminal device, fifth indication information to the network device, wherein the fifth indication information is used to indicate whether the terminal device performs measurement based on the NCSG.

Correspondingly, the above information transmission method applied to the network device further includes:

receiving, by the network device, the fifth indication information sent by the terminal device; and determining, by the network device, whether the terminal device performs measurement based on the NCSG according to the fifth indication information.

In an exemplary implementation, the fifth indication information may include newly added signaling in the NR system, for example, the newly added signaling needForNcsgsInfoNR-R17 in RRCReconfigurationComplete or RRCResumeComplete.

Optionally, the fifth indication information includes second intra-frequency indication information and/or second inter-frequency indication information;

the second intra-frequency indication information is used to indicate whether the terminal device performs intra-frequency measurement based on the NCSG;

the second inter-frequency indication information is used to indicate whether the terminal device performs inter-frequency measurement based on the NCSG.

Correspondingly, in the above information transmission method, determining, by the network device, whether the terminal device performs measurement based on the NCSG according to the fifth indication information, includes:

determining, by the network device, whether the terminal device performs intra-frequency measurement based on the NCSG according to second intra-frequency indication information in the fifth indication information; and/or, determining, by the network device, whether the terminal device performs inter-frequency measurement based on the NCSG according to second inter-frequency indication information in the fifth indication information.

That is, the fifth indication information may respectively indicate whether the measurement is performed based on the NCSG for the intra-frequency measurement and inter-frequency measurement.

Taking RRCReconfigurationComplete carrying the fifth indication information as an example, the RRCReconfigurationComplete message may use the following two methods to describe the second intra-frequency indication information and the second inter-frequency indication information:

Method 1: the fifth indication information is needForNcsgsInfoNR-R17, and the second intra-frequency indication information and the second inter-frequency indication information are packed into an IE corresponding to needForNcsgsInfoNR-R17.

Specifically, the RRCReconfigurationComplete message contains:

| needForNcsgsInfoNR-R17 | needForNcsgsInfoNR-R17 | OPTIONAL |
|---|---|---|
| the corresponding IE (NeedForNcsgsInfoNR information element) contains: | | |
| ncsgIndicationIntra-r17 | ENUMERATED {ncsg, no-gap-no-ncsg} | |
| ncsgIndication-r17 | ENUMERATED {ncsg, no-gap-no-ncsg} | |

The ncsgIndicationIntra-r17 is the second intra-frequency indication information, and ncsgIndication-r17 is the second inter-frequency indication information. The enumerated values for both include ncsg and no-gap-no-ncsg, indicating performing measurement based on the NCSG or performing measurement not based on the NCSG, respectively. Optionally, no-gap-no-ncsg may further indicate performing measurement not based on MG.

Alternatively, enumerated values for both include ncsg, gap and no-gap-no-ncsg, indicating performing measurement based on the NCSG, performing measurement based on the MG, or performing measurement not based on the NCSG and not based on the MG, respectively.

Method 2: the second intra-frequency indication information and the second inter-frequency indication information are directly placed in the RRCReconfigurationComplete message.

Specifically, the RRCReconfigurationComplete message contains:

| intraFreq-needForNcsg-r17 | NeedForGapsIntraFreqlist -r17 | OPTIONAL, |
|---|---|---|
| interFreq-needForNcsg-r17 | NeedForGapsBandlist NR-r17 | OPTIONAL |

The intraFreq-needForNcsg-r17 is the second intra-frequency indication information, and the interFreq-needForNcsg-r17 is the second inter-frequency indication information.

Optionally, the fifth indication information includes fourth signaling, and the fourth signaling includes a first parameter, and the first parameter is used to indicate whether the terminal device performs measurement based on the MG.

For example, the fourth signaling is the NeedForGapsInfoNR information in RRCReconfigurationComplete or RRCResumeComplete, which contains the first parameter. The first parameter may include gapIndicationIntra and/or gapIndication, indicating whether the terminal performs measurement based on the MG in the case of intra-frequency measurement and the inter-frequency measurement, respectively.

That is to say, the fifth indication information indicates whether the terminal device performs measurement based on the MG and indicates whether the terminal device performs measurement based on the NCSG. Therefore, it is possible to accurately indicate three requirements of the terminal device in practical applications: only the MG is required, only the NCSG is required, and neither the MG nor the NCSG is required.

In embodiments of the present disclosure, multiple optional exemplary ways of reporting NCSG requirement in the fifth indication information are also provided.

Example 8: in a case that the first parameter indicates that the measurement is performed based on the MG, whether to perform the measurement based on the NCSG is determined according to a second parameter in the fourth signaling, and it can be understood that the NCSG is considered as a kind of MG. In practical applications, if the measurement is performed based on the NCSG, the measurement is performed not based on the MG, and if the measurement is performed not based on the NCSG, the measurement is performed based on the MG.

That is to say, the fourth signaling further includes a second parameter; in a case where the first parameter indicates that the terminal device performs measurement based on the MG and the value of the second parameter is a third value, the fifth indication information is used to indicate that the terminal device performs measurement based on the NCSG. The third value is a predetermined value, such as 0 or 1.

Correspondingly, in the above information transmission method, determining, by the network device, whether the terminal device performs measurement based on the NCSG according to the fifth indication information may include:

in a case where the first parameter indicates that the terminal device performs measurement based on the MG and the value of the second parameter is a third value, determining, by the network device that the terminal device performs measurement based on the NCSG.

Specifically, since the NCSG is regarded as a kind of MG, if the first parameter indicates that the measurement is performed not based on the MG, the fifth indication information is used to indicate that the terminal device performs measurement not based on the MG and not based on the NCSG.

In addition, when the first parameter indicates that the measurement is performed based on the MG and the value of the second parameter is not the third value, the fifth indication information is used to indicate that the terminal device performs the measurement based on the MG.

Optionally, the second parameter may include intra-frequency indication information ncsgIndicationIntra and inter-frequency indication information ncsgIndication. This information may be described in the following form:

| | |
|---|---|
| ncsgIndicationIntra-r17 | ENUMERATED {gap, ncsg}, OPTIONAL -Cond gap |
| ncsgIndication-r17 | ENUMERATED {gap, ncsg}, OPTIONAL -Cond gap |

Example 9: in a case that the first parameter indicates that the measurement is performed based on the MG, whether the measurement is performed based on the NCSG is determined according to whether the fourth signaling includes the second parameter. It can be understood that the NCSG is considered as a special case of the MG.

That is to say, in the case where the first parameter indicates that the terminal device performs measurement based on the MG and the fourth signaling includes the second parameter, the fifth indication information is used to indicate that the terminal device performs measurement based on the NCSG.

Correspondingly, in the above information transmission method, determining, by the network device, whether the terminal device performs measurement based on the NCSG according to the fifth indication information may include:

In a case where the first parameter indicates that the terminal device performs measurement based on the MG and the fourth signaling includes the second parameter, determining, by the network device, that the terminal device performs measurement based on the NCSG.

Specifically, since NCSG is regarded as a special case of MG, when the first parameter indicates that measurement is not based on the MG, the fifth indication information is used to indicate that the terminal device performs measurement not based on the MG and not based on the NCSG.

In addition, in a case where the first parameter indicates that the measurement is performed based on the MG and the second parameter is not included in the fourth signaling, the fifth indication information is used to indicate that the terminal device performs the measurement based on the MG.

Optionally, the second parameter may include intra-frequency indication information ncsgIndicationIntra and inter-frequency indication information ncsgIndication. This information may be described in the following form:

| | |
|---|---|
| ncsgIndicationIntra-r17 | ENUMERATED {ncsg}, OPTIONAL -Cond gap |
| ncsgIndication-r17 | ENUMERATED {ncsg}, OPTIONAL -Cond gap |

Example 10: in a case where the first parameter indicates that measurement is not based on MG, whether measurement is performed based on the NCSG is determined according to the second parameter in the fourth signaling. It can be understood that NCSG is considered as a case that does not require the MG.

That is to say, the fourth signaling further includes a second parameter; in a case where the first parameter indicates that the terminal device performs measurement not based on the MG and the value of the second parameter is the fourth value, the fifth indication information is used to indicate that the terminal device performs measurement based on the NCSG. The fourth value is a predetermined value, such as 0 or 1.

Correspondingly, in the above information transmission method, determining, by the network device, whether the terminal device performs measurement based on the NCSG according to the fifth indication information may include:

in a case where the first parameter indicates that the terminal device performs measurement not based on the MG and the value of the second parameter is the fourth value, determining, by the network device, that the terminal device performs measurement based on the NCSG.

Specifically, since the NCSG is regarded as a case that does not require the MG, in the case where the first parameter indicates that the measurement is based on the MG, the fifth indication information is used to indicate that the terminal device performs the measurement based on the MG.

In addition, in the case where the first parameter indicates that the measurement is not based on MG and the value of the second parameter is not the fourth value, the fifth indication information is used to indicate that the terminal device performs measurement not based on MG and not based on NCSG.

Optionally, the second parameter may include intra-frequency indication information ncsgIndicationIntra and inter-frequency indication information ncsgIndication.

This information may be described in the following form:

| | | |
|---|---|---|
| ncsgIndicationIntra-r17 | ENUMERATED {no-gap, ncsg}, OPTIONAL | -Cond no-gap |
| ncsgIndication-r17 | ENUMERATED {no-gap, ncsg}, OPTIONAL | -Cond no-gap |

Example 11: in a case where the first parameter indicates that the measurement is not based on the MG, whether the measurement is performed based on the NCSG is determined according to whether the fourth signaling includes the second parameter. It can be understood that the NCSG is considered as a special case that does not require the MG.

That is to say, in a case where the first parameter indicates that the terminal device performs measurement not based on the MG and the fourth signaling includes the second parameter, the fifth indication information is used to indicate that the terminal device performs measurement based on the NCSG.

Correspondingly, in the above information transmission method, determining, by the network device, whether the terminal device performs measurement based on the NCSG according to the fifth indication information, includes:

in a case where the first parameter indicates that the terminal device performs measurement not based on the MG and the fourth signaling includes the second parameter, determining, by the network device, that the terminal device performs measurement based on the NCSG.

Specifically, since NCSG is regarded as a special case that does not require MG, in the case that the first parameter indicates measurement is performed based on the MG, the fifth indication information is used to indicate that the terminal device performs measurement based on MG.

In addition, in a case where the first parameter indicates that the measurement is not based on the MG and the second parameter is not included in the fourth signaling, the fifth indication information is used to indicate that the terminal device performs measurement not based on the MG and not based on the NCSG.

Optionally, the second parameter may include intra-frequency indication information ncsgIndicationIntra and inter-frequency indication information ncsgIndication. This information may be described in the following form:

Since the measurement based on the NCSG only needs a short interruption time for the adjustment of the radio frequency chain, the data interruption time during the measurement can be reduced.

Figure 6:
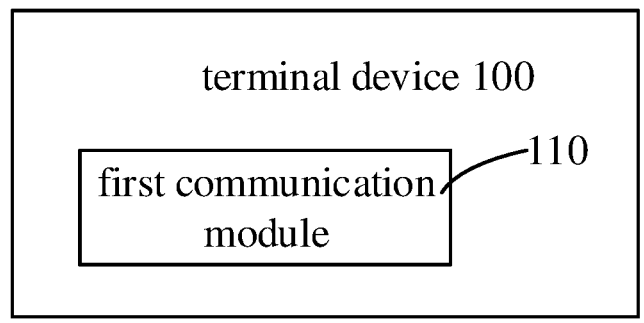
FIG. 6 is a schematic structural block diagram of a terminal device according to an embodiment of the present disclosure.

Corresponding to the processing method in at least one of the foregoing embodiments, an embodiment of the present disclosure further provides a terminal device 100. Referring to FIG. 6, the terminal device 100 includes a first communication module 110.

The first communication module 110 is configured to, in a case where Network Control Small Gap (NCSG) is supported, send first indication information to a network device;

wherein the first indication information is used to indicate NCSG configuration information supported by the terminal device.

Optionally, the first indication information includes first signaling, the first signaling is used to indicate Measurement Gap (MG) configuration information supported by the terminal device 100, and the MG configuration information supported by the terminal device 100 has a corresponding relationship with the NCSG configuration information supported by the terminal device.

Optionally, the first indication information includes a first sequence, and the first sequence includes identity information of the NCSG configuration information supported by the terminal device 100.

Optionally, the first indication information includes a first bit string;

wherein the first bit string includes N bits, each of the N bits corresponds to at least one piece of NCSG configuration information, and NCSG configuration information corresponding to different bits in the N bits is different;

wherein in a case where a value of an i-th bit among the N bits is a first value, the i-th bit is used to indicate that the terminal device 100 supports at least one piece of NCSG configuration information corresponding to the

| | | |
|---|---|---|
| ncsgIndicationIntra-r17 | ENUMERATED {ncsg}, OPTIONAL | -Cond no-gap |
| ncsgIndication-r17 | ENUMERATED {ncsg}, OPTIONAL | -Cond no-gap |

It should be noted that, the foregoing examples introduce different ways of interpreting the first parameter in the fourth signaling on the basis that the terminal device supports the NCSG. In practical applications, if the terminal device does not support the NCSG, the first parameter is only used to indicate whether measurement is performed based on the MG. For example, if the value is gap, it means that MG is required, and if the value is no-gap, it means that neither MG nor NCSG is required.

The above describes the specific configuration and implementations of the embodiments of the present disclosure from different perspectives through multiple embodiments. Using at least one of the above embodiments, if the terminal device supports the NCSG, the first indication information is sent to indicate the NCSG configuration information supported by the terminal device. In this way, the network device can perform configuration accordingly, and the terminal device can perform measurement based on the NCSG.

i-th bit, where N is a positive integer, and i is a positive integer less than or equal to N.

Optionally, the i-th bit corresponds to an i-th piece of NCSG configuration information among pre-configured N pieces of NCSG configuration information.

Optionally, the i-th bit corresponds to an i-th NCSG configuration information group in pre-configured N NCSG configuration information groups, the i-th NCSG configuration information group includes at least one piece of NCSG configuration information, and the at least one piece of NCSG configuration information corresponds to same MG configuration information.

Optionally, the i-th bit corresponds to an i-th piece of non-mandatory NCSG configuration information in pre-configured M pieces of NCSG configuration information;

wherein the M pieces of NCSG configuration information include L pieces of mandatory NCSG configuration information and N pieces of non-mandatory NCSG configuration information, and both M and L are positive integers.

Optionally, the i-th bit corresponds to an i-th non-mandatory NCSG configuration information group in pre-configured X NCSG configuration information groups, the i-th non-mandatory NCSG configuration information group includes at least one piece of NCSG configuration information, and the at least one piece of NCSG configuration information corresponds to same MG configuration information;
    wherein the X NCSG configuration information groups include Y mandatory NCSG configuration information groups and N non-mandatory NCSG configuration information groups, and both X and Y are positive integers.

Optionally, the first communication module 110 is further configured to:
    send second indication information to the network device, wherein the second indication information is used to indicate whether the terminal device 100 supports the NCSG.

Optionally, in a case where the second indication information includes second signaling, the second indication information is used to indicate that the terminal device 100 supports the NCSG when performing inter-frequency measurement;
    the second signaling is used to indicate that the terminal device 100 does not need an MG in a case where inter-frequency measurement is performed.

Optionally, the second indication information includes first intra-frequency indication information and/or first inter-frequency indication information;
    wherein the first intra-frequency indication information is used to indicate whether the terminal device 100 supports the NCSG in a case of intra-frequency measurement;
    wherein the first inter-frequency indication information is used to indicate whether the terminal device 100 supports the NCSG in a case of inter-frequency measurement.

Optionally, the first indication information is further used to indicate that the terminal device 100 supports the NCSG.

Optionally, the first communication module 110 is further configured to:
    send third indication information to the network device, wherein the third indication information is used to indicate whether the terminal device 100 supports dynamic reporting of NCSG requirement information.

Optionally, the first communication module 110 is further configured to:
    receive fourth indication information from the network device, wherein the fourth indication information is used to indicate a frequency band for which the NCSG is dynamically reported.

Optionally, the fourth indication information is carried by third signaling, and the third signaling is used to indicate whether the network device supports dynamic reporting of MG requirement information.

Optionally, the third signaling is further used to indicate a frequency band for which MG is dynamically reported;
    wherein the fourth indication information includes frequency band indication information, and the frequency band indication information is used to indicate whether to use the frequency band for which MG is dynamically reported as the frequency band for which the NCSG is dynamically reported.

Optionally, the fourth indication information includes a second sequence, and the second sequence includes identity information of the frequency band for which the NCSG is dynamically reported.

Optionally, the fourth indication information includes a second bit string;
    wherein the second bit string includes K bits, each of the K bits corresponds to at least one frequency band, and different bits in the K bits correspond to different frequency bands;
    wherein in a case where a value of a j-th bit among the K bits is a second value, the j-th bit is used to indicate that at least one frequency band corresponding to the j-th bit is the frequency band for which the NCSG is dynamically reported.

Optionally, the first communication module 110 is further configured to:
    send fifth indication information to the network device, wherein the fifth indication information is used to indicate whether the terminal device 100 performs measurement based on the NCSG.

Optionally, the fifth indication information includes second intra-frequency indication information and/or second inter-frequency indication information;
    wherein the second intra-frequency indication information is used to indicate whether the terminal device 100 performs intra-frequency measurement based on the NCSG;
    wherein the second inter-frequency indication information is used to indicate whether the terminal device 100 performs inter-frequency measurement based on the NCSG.

Optionally, the fifth indication information includes fourth signaling, the fourth signaling includes a first parameter, and the first parameter is used to indicate whether the terminal device 100 performs measurement based on MG.

Optionally, the fourth signaling further includes a second parameter, and in a case where the first parameter indicates that the terminal device 100 performs measurement based on MG and a value of the second parameter is a third value, the fifth indication information is used to indicate that the terminal device 100 performs measurement based on the NCSG.

Optionally, in a case where the first parameter indicates that the terminal device 100 performs measurement based on MG and the second parameter is included in the fourth signaling, the fifth indication information is used to indicate that the terminal device 100 performs measurement based on the NCSG.

Optionally, the fourth signaling further includes a second parameter, and in a case where the first parameter indicates that the terminal device 100 performs measurement not based on the MG and a value of the second parameter is a fourth value, the fifth indication information is used to indicate that the terminal device 100 performs measurement based on the NCSG.

Optionally, in a case where the first parameter indicates that the terminal device performs measurement not based on MG and the second parameter is included in the fourth signaling, the fifth indication information is used to indicate that the terminal device performs measurement based on the NCSG.

The terminal device 100 of the embodiments of the present disclosure is capable of realizing the corresponding functions of the terminal device in the aforementioned method embodiments, and the corresponding processes, functions, implementations and beneficial effects of the various modules (sub-modules, units, or components, etc.) in the terminal device 100 can be found in the corresponding descriptions in the aforementioned method embodiments, and repeated descriptions will be omitted here.

Figure 7:
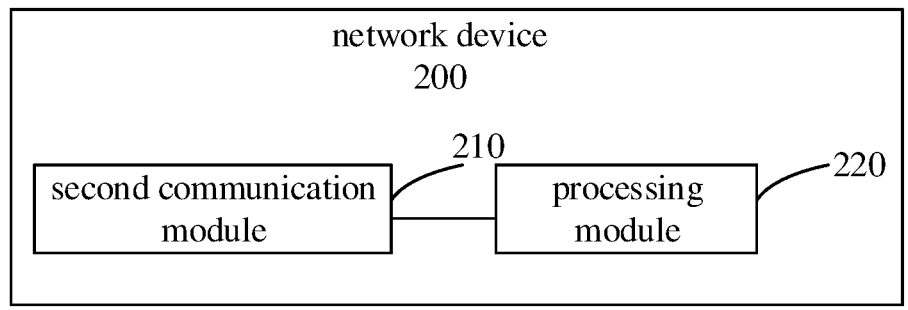
FIG. 7 is a schematic structural block diagram of a network device according to another embodiment of the present disclosure.

Corresponding to the processing method in at least one of the above embodiments, an embodiment of the present disclosure further provides a network device 200. Referring to FIG. 7, the network device 200 includes a second communication module 210 and a processing module 220.

The second communication module 210 is configured to receive first indication information which is sent by a terminal device in a case where Network Control Small Gap (NCSG) is supported.

The processing module 220 is configured to determine NCSG configuration information supported by the terminal device according to the first indication information.

Optionally, the first indication information includes first signaling, the first signaling is used to indicate Measurement Gap (MG) configuration information supported by the terminal device, and the MG configuration information supported by the terminal device has a corresponding relationship with the NCSG configuration information supported by the terminal device.

Optionally, the first indication information includes a first sequence, and the first sequence includes identity information of the NCSG configuration information supported by the terminal device.

Optionally, the first indication information includes a first bit string;
    wherein the first bit string includes N bits, each of the N bits corresponds to at least one piece of NCSG configuration information, and NCSG configuration information corresponding to different bits in the N bits is different;
    wherein in a case where a value of an i-th bit among the N bits is a first value, the i-th bit is used to indicate that the terminal device supports at least one piece of NCSG configuration information corresponding to the i-th bit, where N is a positive integer, and i is a positive integer less than or equal to N.

Optionally, the second communication module 210 is further configured to: receive second indication information sent by the terminal device; and
    the processing module 220 is further configured to determine whether the terminal device supports the NCSG according to the second indication information.

Optionally, the processing module 220 is configured to:
    in a case where the second indication information includes second signaling, determine that the terminal device supports the NCSG in a case where inter-frequency measurement is performed;
    wherein the second signaling is used to indicate that the terminal device does not need MG in a case where inter-frequency measurement is performed.

Optionally, the processing module 220 is configured to:
    determine whether the terminal device supports the NCSG in a case of intra-frequency measurement according to first intra-frequency indication information in the second indication information;
    and/or,
    determine whether the terminal device supports the NCSG in a case of inter-frequency measurement according to first inter-frequency indication information in the second indication information.

Optionally, the processing module 220 is further configured to:
    in a case of receiving the first indication information sent by the terminal device, determine that the terminal device supports the NCSG.

Optionally, the processing module 220 is further configured to:
    determine whether the terminal device supports dynamic reporting of NCSG requirement information according to third indication information sent by the terminal device.

Optionally, the second communication module 210 is further configured to:
    send fourth indication information to the terminal device, wherein the fourth indication information is used to indicate a frequency band for which the NCSG is dynamically reported.

Optionally, the fourth indication information is carried by third signaling, and the third signaling is used to indicate whether the network device 200 supports dynamic reporting of MG requirement information.

Optionally, the third signaling is further used to indicate a frequency band for which MG is dynamically reported;
    wherein the fourth indication information includes frequency band indication information, and the frequency band indication information is used to indicate whether to use the frequency band for which the MG is dynamically reported as the frequency band for which the NCSG is dynamically reported.

Optionally, the fourth indication information includes a second sequence, and the second sequence includes identity information of the frequency band for which the NCSG is dynamically reported.

Optionally, the fourth indication information includes a second bit string;
    wherein the second bit string includes K bits, each of the K bits corresponds to at least one frequency band, and different bits in the K bits correspond to different frequency bands;
    wherein in a case where a value of a j-th bit among the K bits is a second value, the j-th bit is used to indicate that at least one frequency band corresponding to the j-th bit is the frequency band for which the NCSG is dynamically reported.

Optionally, the second communication module 210 is further configured to: receive fifth indication information sent by the terminal device; and
    the processing module 220 is further configured to determine whether the terminal device performs measurement based on the NCSG according to the fifth indication information.

Optionally, the processing module 220 is configured to:
    determine whether the terminal device performs intra-frequency measurement based on the NCSG according to second intra-frequency indication information in the fifth indication information;
    and/or,
    determine whether the terminal device performs inter-frequency measurement based on the NCSG according to second inter-frequency indication information in the fifth indication information.

Optionally, the fifth indication information includes fourth signaling, the fourth signaling includes a first parameter, and the first parameter is used to indicate whether the terminal device performs measurement based on the MG.

Optionally, the fourth signaling further includes a second parameter;

the processing module 220 is configured to:

in a case where the first parameter indicates that the terminal device performs measurement based on the MG and a value of the second parameter is a third value, determine that the terminal device performs measurement based on the NCSG.

Optionally, the processing module 220 is configured to:

in a case where the first parameter indicates that the terminal device performs measurement based on the MG and the fourth signaling includes a second parameter, determine that the terminal device performs measurement based on the NCSG.

Optionally, the fourth signaling further includes a second parameter;

the processing module 220 is configured to:

in a case where the first parameter indicates that the terminal device performs measurement not based on the MG and a value of the second parameter is a fourth value, determine that the terminal device performs measurement based on the NCSG.

Optionally, the processing module 220 is configured to:

in a case where the first parameter indicates that the terminal device performs measurement not based on the MG and the fourth signaling includes a second parameter, determine that the terminal device performs measurement based on the NCSG.

The network device 200 of the embodiments of the present disclosure is capable of realizing the corresponding functions of the network device in the aforementioned method embodiments, and the corresponding processes, functions, implementations and beneficial effects of the various modules (sub-modules, units, or components, etc.) in the network device 200 can be found in the corresponding descriptions in the aforementioned method embodiments, and repeated descriptions will be omitted here.

It should be noted that the functions described with respect to the various modules (sub-modules, units or components, etc.) in the network device 200 in the embodiments of the present disclosure may be implemented by different modules (sub-modules, units or components, etc.), or may be implemented by the same module (sub-module, unit or component, etc.), and the both can realize the corresponding functions of the network device in the embodiments of the present disclosure.

Figure 8:
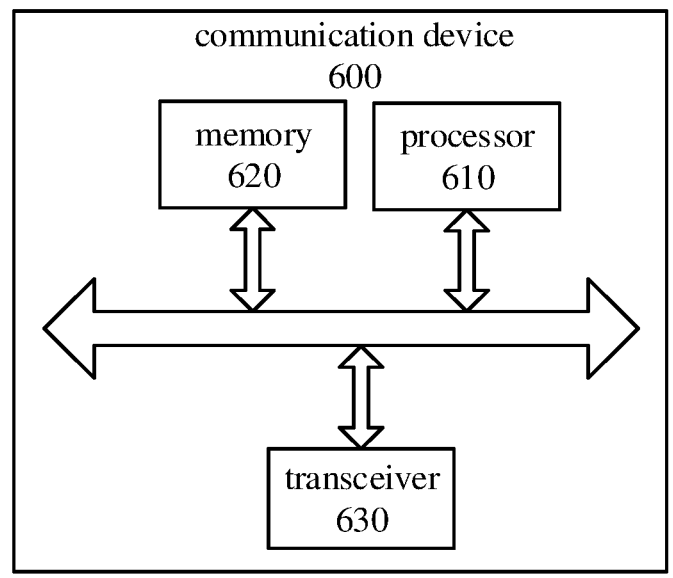
FIG. 8 is a schematic block diagram of a communication device according to an embodiment of the present disclosure.

FIG. 8 is a schematic structural diagram of a communication device 600 according to an embodiment of the present disclosure. The communication device 600 includes a processor 610, and the processor 610 may call and run a computer program from a memory to implement the methods in the embodiments of the present disclosure.

Optionally, the communication device 600 may further include a memory 620. The processor 610 may call and run a computer program from the memory 620, so as to implement the methods in the embodiments of the present disclosure.

The memory 620 may be an independent device independent of the processor 610, or may be integrated in the processor 610.

Optionally, the communication device 600 may further include a transceiver 630, and the processor 610 may control the transceiver 630 to communicate with other devices, specifically, to send information or data to other devices, or to receive information or data sent from other devices.

The transceiver 630 may include a transmitter and a receiver. The transceiver 630 may further include one or more antennas.

Optionally, the communication device 600 may be the terminal device of the embodiments of the present disclosure, and the communication device 600 may implement the corresponding processes implemented by the terminal device in the methods of the embodiments of the present disclosure. For the sake of brevity, details are not repeated here.

Optionally, the communication device 600 may be the network device of the embodiments of the present disclosure, and the communication device 600 may implement the corresponding processes implemented by the network device in the methods of the embodiments of the present disclosure. For the sake of brevity, details are not repeated here.

Figure 9:
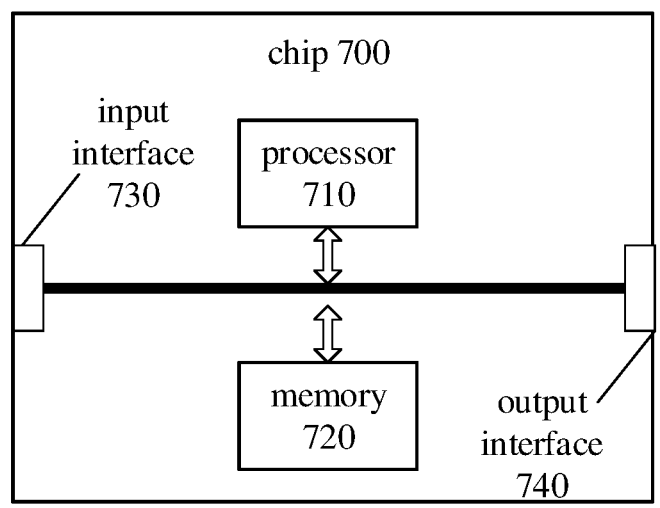
FIG. 9 is a schematic block diagram of a chip according to an embodiment of the present disclosure.

FIG. 9 is a schematic structural diagram of a chip 700 according to an embodiment of the present disclosure. The chip 700 includes a processor 710, and the processor 710 may call and run a computer program from a memory to implement the methods in the embodiments of the present disclosure.

Optionally, the chip 700 may further include a memory 720. The processor 710 may call and run a computer program from the memory 720, so as to implement the methods in the embodiments of the present disclosure.

The memory 720 may be an independent device independent of the processor 710, or may be integrated in the processor 710.

Optionally, the chip 700 may further include an input interface 730. The processor 710 may control the input interface 730 to communicate with other devices or chips. Specifically, the processor 710 may control the input interface to obtain information or data sent by other devices or chips.

Optionally, the chip 700 may further include an output interface 740. The processor 710 may control the output interface 740 to communicate with other devices or chips. Specifically, the processor 710 may control the output interface to output information or data to other devices or chips.

Optionally, the chip may be applied to the terminal device in the embodiments of the present disclosure, and the chip may implement the corresponding processes implemented by the terminal device in the methods of the embodiments of the present disclosure. For the sake of brevity, details are not repeated here.

Optionally, the chip may be applied to the network device in the embodiments of the present disclosure, and the chip may implement the corresponding processes implemented by the network device in the methods of the embodiments of the present disclosure. For the sake of brevity, details are not repeated here.

It should be understood that the chip mentioned in the embodiments of the present disclosure may also be called a system level chip, a system chip, a chip system, or a system-on-chip.

The processor mentioned above may be a general-purpose processor, a digital signal processor (DSP), a Field Programmable Gate Array (FPGA), an Application Specific Integrated Circuit (ASIC) or other programmable logic devices, transistor logic devices, discrete hardware components, etc. The general-purpose processor mentioned above may be a microprocessor or any conventional processor or the like.

The aforementioned memory may be volatile memory or nonvolatile memory, or may include both volatile and nonvolatile memories. Among them, the non-volatile memory may be Read-Only Memory (ROM), Programmable ROM (PROM), erasable PROM (EPROM), electrically EPROM (EEPROM) or flash memory. The volatile memory may be Random Access Memory (RAM).

It should be understood that the above-mentioned memory is illustrative but not restrictive. For example, the memory in the embodiments of the present disclosure may also be a static RAM (SRAM), a dynamic RAM (DRAM), synchronous DRAM (SDRAM), double data rate SDRAM (DDR SDRAM), enhanced synchronous dynamic random access memory (enhanced SDRAM, ESDRAM), synch link DRAM (SLDRAM) or Direct Rambus RAM (DR RAM), etc. That is, the memory in the embodiments of the present disclosure is intended to include, but not be limited to, these or any other suitable types of memory.

Figure 10:
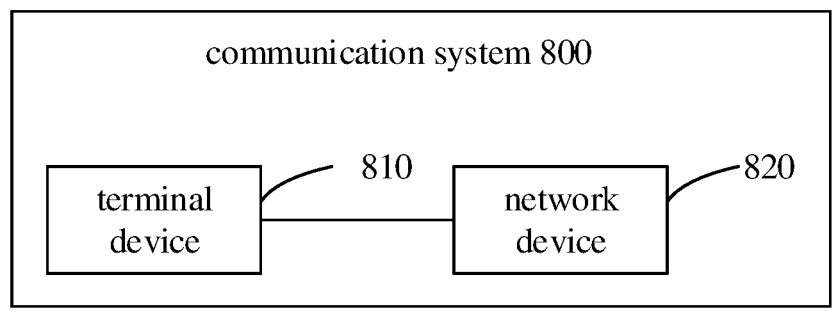
FIG. 10 is a schematic block diagram of a communication system according to an embodiment of the present disclosure.

FIG. 10 is a schematic block diagram of a communication system 800 according to an embodiment of the present disclosure. The communication system 800 includes a terminal device 810 and a network device 820.

The terminal device 810 may be used to realize the corresponding functions realized by the terminal device in the methods of the various embodiments of the present disclosure, and the network device 820 may be used to realize the corresponding functions realized by the network device in the methods of the various embodiments of the present disclosure. For the sake of brevity, details are not repeated here.

All or part of the above embodiments may be implemented by software, hardware, firmware or any combination thereof. When implemented using software, embodiments may be implemented in whole or in part in the form of a computer program product. The computer program product includes one or more computer instructions. When the computer program instructions are loaded and executed on a computer, the processes or functions according to the embodiments of the present disclosure are generated in whole or in part. The computer can be a general-purpose computer, a special-purpose computer, a computer network, or other programmable device. The computer instructions may be stored in a computer-readable storage medium, or may be transmitted from one computer-readable storage medium to another computer-readable storage medium. For example, the computer instructions may be transmitted from a website site, a computer, a server or a data center to another web site site, another computer, another server or another data center in a wired manner (e.g., coaxial cable, optical fiber, Digital Subscriber Line (DSL)) or a wireless manner (e.g., infrared, wireless, microwave, etc.). The computer-readable storage medium may be any available medium that can be accessed by a computer, or a data storage device such as a server or a data center integrated with one or more available mediums. The available medium may be a magnetic medium (for example, a floppy disk, a hard disk, or a magnetic tape), an optical medium (for example, DVD), or a semiconductor medium (for example, a Solid State Disk (SSD)), and the like.

It should be understood that, in various embodiments of the present disclosure, the sequence numbers of the above-mentioned processes do not mean the order of execution, and the execution order of the processes should be determined by their functions and internal logic, and the sequence numbers should not be considered as constituting any limitation on the implementations of the embodiments of the present disclosure.

Those skilled in the art can clearly understand that for the convenience and brevity of the description, for the specific working procedure of the above-described systems, devices and units, reference can be made to the corresponding processes in the foregoing method embodiments, which will not be repeated here.

The above is only the example implementations of the present disclosure, but the scope of protection of the present disclosure is not limited thereto. Anyone familiar with the technical field can easily think of changes or substitutions within the technical scope disclosed in the present disclosure, and such changes or substitutions fall within the scope of protection of the present disclosure. Therefore, the protection scope of the present disclosure should be based on the protection scope of the claims.

What is claimed is:

1. A terminal device, comprising:
  a processor; and
  a memory storing instructions executable by the processor;
  wherein when the instructions are executed by the processor, the terminal device is caused to:
    in a case where Network Control Small Gap (NCSG) is supported, send first indication information to a network device;
  wherein the first indication information is used to indicate NCSG configuration information supported by the terminal device;
  wherein the first indication information sent by the terminal device comprises a first bit string;
  wherein the first bit string comprises N bits, each of the N bits corresponds to at least one piece of NCSG configuration information, and NCSG configuration information corresponding to different bits in the N bits is different;
  wherein in a case where a value of an i-th bit among the N bits is a first value, the i-th bit is used to indicate that the terminal device supports at least one piece of NCSG configuration information corresponding to the i-th bit, where N is a positive integer, and i is a positive integer less than or equal to N.

2. The terminal device according to claim 1, wherein the i-th bit corresponds to an i-th piece of NCSG configuration information among the N pieces of NCSG configuration information, wherein the N pieces of NCSG configuration are defined in a communication system, and each of the N pieces of NCSG configuration comprises at least one NCSG pattern.

3. The terminal device according to claim 1, wherein when the instructions are executed by the processor, the terminal device is further caused to:
  send third indication information to the network device, wherein the third indication information is used to indicate whether the terminal device supports reporting of NCSG requirement information.

4. The terminal device according to claim 1, wherein when the instructions are executed by the processor, the terminal device is further caused to:
  receive fourth indication information from the network device, wherein the fourth indication information is used to indicate a frequency band for which NCSG requirement information is reported.

5. The terminal device according to claim 4, wherein the fourth indication information comprises a second sequence, and the second sequence comprises identity information of the frequency band for which the NCSG requirement information is reported.

6. The terminal device according to claim 1, wherein when the instructions are executed by the processor, the terminal device is further caused to:

send fifth indication information to the network device, wherein the fifth indication information is used to indicate whether NCSG is required for the terminal device to perform measurement.

7. The terminal device according to claim 6, wherein the fifth indication information comprises second intra-frequency indication information and/or second inter-frequency indication information;
wherein the second intra-frequency indication information is used to indicate whether NCSG is required for the terminal device to perform intra-frequency measurement;
wherein the second inter-frequency indication information is used to indicate whether NCSG is required for the terminal device to perform inter-frequency measurement.

8. The terminal device according to claim 6, wherein the fifth indication information comprises fourth signaling, the fourth signaling comprises a first parameter, and the first parameter is used to indicate whether MG is required for the terminal device to perform measurement.

9. An information transmission method, comprising:
receiving, by a network device, first indication information which is sent by a terminal device in a case where Network Control Small Gap (NCSG) is supported; and
determining, by the network device, NCSG configuration information supported by the terminal device according to the first indication information;
wherein the first indication information sent by the terminal device comprises a first bit string;
wherein the first bit string comprises N bits, each of the N bits corresponds to at least one piece of NCSG configuration information, and NCSG configuration information corresponding to different bits in the N bits is different;
wherein in a case where a value of an i-th bit among the N bits is a first value, the i-th bit is used to indicate that the terminal device supports at least one piece of NCSG configuration information corresponding to the i-th bit, where N is a positive integer, and i is a positive integer less than or equal to N.

10. The method according to claim 9, wherein the i-th bit corresponds to an i-th piece of NCSG configuration information among the N pieces of NCSG configuration information, wherein the N pieces of NCSG configuration are defined in a communication system, and each of the N pieces of NCSG configuration comprises at least one NCSG pattern.

11. The method according to claim 9, further comprising:
determining, by the network device, whether the terminal device supports reporting of NCSG requirement information according to third indication information sent by the terminal device.

12. The method according to claim 9, further comprising:
sending, by the network device, fourth indication information to the terminal device, wherein the fourth indication information is used to indicate a frequency band for which the NCSG requirement information is reported.

13. The method according to claim 12, wherein the fourth indication information comprises a second sequence, and the second sequence comprises identity information of the frequency band for which the NCSG requirement information is reported.

14. The method according to claim 9, further comprising:
receiving, by the network device, fifth indication information sent by the terminal device; and
determining, by the network device according to the fifth indication information, whether NCSG is required for the terminal device to perform measurement.

15. A network device, comprising:
a processor; and
a memory storing instructions executable by the processor;
wherein when the instructions are executed by the processor, the network device is caused to:
receive first indication information which is sent by a terminal device in a case where Network Control Small Gap (NCSG) is supported; and
determine NCSG configuration information supported by the terminal device according to the first indication information;
wherein the first indication information sent by the terminal device comprises a first bit string;
wherein the first bit string comprises N bits, each of the N bits corresponds to at least one piece of NCSG configuration information, and NCSG configuration information corresponding to different bits in the N bits is different;
wherein in a case where a value of an i-th bit among the N bits is a first value, the i-th bit is used to indicate that the terminal device supports at least one piece of NCSG configuration information corresponding to the i-th bit, where N is a positive integer, and i is a positive integer less than or equal to N.

16. The network device according to claim 15, wherein when the instructions are executed by the processor, the network device is caused to:
receive fifth indication information sent by the terminal device; and
determine whether NCSG is required for the terminal device to perform measurement according to the fifth indication information.

17. The network device according to claim 16, wherein when the instructions are executed by the processor, the network device is caused to:
determine whether NCSG is required for the terminal device to perform intra-frequency measurement according to second intra-frequency indication information in the fifth indication information;
and/or,
determine whether NCSG is required for the terminal device to perform inter-frequency measurement according to second inter-frequency indication information in the fifth indication information.

18. The network device according to claim 16, wherein the fifth indication information comprises fourth signaling, the fourth signaling comprises a first parameter, and the first parameter is used to indicate whether MG is required for the terminal device to perform measurement.

* * * * *